(12) United States Patent
Han et al.

(10) Patent No.: US 12,252,650 B2
(45) Date of Patent: Mar. 18, 2025

(54) APPARATUS FOR ON-LINE TEMPERATURE MEASUREMENT AND GAS SAMPLING USED IN CHUTE ZONE OF DRY QUENCHING COKE OVEN AND USING METHOD THEREOF

(71) Applicant: MCC5 GROUP SHANGHAI CORPORATION LIMITED., Shanghai (CN)

(72) Inventors: Cangjuan Han, Shanghai (CN); Chunhua Tan, Shanghai (CN); Wenjian Gao, Shanghai (CN); Pengmin Wu, Shanghai (CN)

(73) Assignee: MCC5 GROUP SHANGHAI CORPORATION LIMITED, Shanghai (CN)

( * ) Notice: Subject to any disclaimer, the term of this patent is extended or adjusted under 35 U.S.C. 154(b) by 174 days.

(21) Appl. No.: 17/834,543

(22) Filed: Jun. 7, 2022

(65) Prior Publication Data

US 2023/0159829 A1    May 25, 2023

(51) Int. Cl.
| | |
|---|---|
| *C10B 45/00* | (2006.01) |
| *C10B 29/02* | (2006.01) |
| *C10B 39/18* | (2006.01) |
| *G01J 5/02* | (2022.01) |
| *G01N 1/22* | (2006.01) |

(52) U.S. Cl.
CPC ............. *C10B 45/00* (2013.01); *C10B 29/02* (2013.01); *C10B 39/18* (2013.01); *G01J 5/021* (2013.01); *G01N 1/2226* (2013.01); *G01N 2001/2282* (2013.01)

(58) Field of Classification Search
None
See application file for complete search history.

(56) References Cited

U.S. PATENT DOCUMENTS 11,926,527 B2 * 3/2024 Cousins ............ G05D 23/1931

FOREIGN PATENT DOCUMENTS

| CN | 105738578 A | * | 7/2016 | ............ G01N 33/00 |
| CN | 113654666 A | * | 11/2021 | |
| JP | 2001164258 A | * | 6/2001 | |

\* cited by examiner

*Primary Examiner* — Peter J Macchiarolo
*Assistant Examiner* — Jermaine L Jenkins
(74) *Attorney, Agent, or Firm* — Global IP Services; Tianhua Gu

(57) ABSTRACT

An apparatus for on-line temperature measurement and gas sampling used in the chute area of CDQ coke oven. The oven external unit includes a temperature indicator, a gas tube, a vacuum tank, and the oven internal unit includes a temperature measuring element, a temperature indicator. The temperature measuring element pass through the oven shell and oven along the oven radical, is located in the upper channel of the high-temperature ceramic tube with double-channel, one end of the high-temperature ceramic tube with double-channel is connected with the gas tube of the vacuum tank. The apparatus solves the problem that hard to measure the temperature and sample the gas of the part where the environment is the most complicated in CDQ coke oven, and has the advantages that the structure is simple, operation is easy to handle and can achieve real-time monitoring for the inner environment of the CDQ coke oven.

13 Claims, 4 Drawing Sheets

APPARATUS FOR ON-LINE TEMPERATURE MEASUREMENT AND GAS SAMPLING USED IN CHUTE ZONE OF DRY QUENCHING COKE OVEN AND USING METHOD THEREOF

TECHNICAL FIELD

The invention relates to an on-line temperature measurement and sampling method, in particular to an apparatus for on-line temperature measurement and gas sampling used in chute zone of dry quenching coke oven (CDQ coke oven mentioned thereafter) and using method thereof.

BACKGROUND OF THE INVENTION

The chute zone of the CDQ coke oven supports the all weight of the upper refractories and the chute zone is one of the most important parts of CDQ coke oven. Usually, the chute zone of CDQ coke oven is the most severely damaged part because the service environment of the refractories in this area is relatively harsh. The refractories here not only have to withstand the pressure from the upper refractories but also undergo temperature fluctuation, gas corrosion and coke erosion. Therefore, studying the temperature change and gas composition of the chute zone of CDQ coke oven is the basis for improving the service life of the refractories here. In recent years, some researchers have conducted studies on the on-line temperature measurement system of industrial oven. For instance, the apparatus disclosed in the patent "visualized on-line measurement system and temperature measurement method for molten iron in blast oven" (CN201911326695.1) comprises a probe, a pan-tilt, a signal conversion unit, a control unit, a display unit and a shield and the system can achieve on-line temperature measurement. However, this system was only used for temperature measurement and visual monitoring of molten iron. Some researchers have also studied the device for on-line temperature measurement and gas sampling of CDQ coke oven. The device for temperature measurement disclosed in a patent "a device for on-line temperature detection and method thereof of CDQ coke oven" (CN201520228748.1) that can measure the temperature of discharge coke on-line via placing the device with an infrared probe for temperature measurement on an inverted L-shaped adjusted bracket. But this device was not suitable to measure the temperature of chute area of CDQ coke oven because there are gas flow, coke falling and large temperature fluctuation inside the CDQ coke oven. The device disclosed in a patent "a device for on-line analysis and sampling pretreatment of CDQ circulating gas" was used in annular flue area for sampling and analyzing the circulating gas in CDQ coke oven. The service environment of this device for sampling and analysis is simple because the main composition of circulating gas is $N_2$ and the device was only impacted by the gas flow. Whereas, as mentioned above, the temperature fluctuation and gas composition in the chute area are much more complicated than that of annular flue area. That means this device cannot be used for sampling and analysis of the gas in the chute area of the CDQ coke oven. Until now, no on-line monitoring apparatus or device has been found to confirm and monitor the temperature and atmosphere of chute area of CDQ coke oven. While, confirming the service environment of refractories in the chute area is the basis for improving the service life of them. Therefore, it is very important and necessary to invent a device and a method of temperature measurement and gas sampling for the chute area of CDQ coke oven.

SUMMARY OF THE INVENTION

The present invention aims to provide a apparatus for safe and reliable on-line temperature measurement and gas sampling used in the chute area of CDQ coke oven and using method thereof.

In order to realize the above objects, the particularly technical solution adopted is as follows:

An apparatus for on-line temperature measurement and gas sampling used in the chute area of CDQ coke oven comprises an oven internal unit and an oven external unit.

Said oven external unit includes a temperature indicator with accuracy of 0.1 degree C., a gas tube and a vacuum tank with gas inlet valve, a gas outlet valve and a vacuum gage.

Said oven internal unit includes a temperature measuring element which is a non-contact infrared temperature probe with ceramic protective sleeve, and the measuring temperature of said probe ranges from 500 degree C. to 1500 degree C., the detection distance ranges from 0.8 meters to 3 meters, the minimum size of detection target is 4 millimeters.

Wherein, the temperature measuring element is placed in the upper channel of the high-temperature ceramic tube with double-channel and the lower channel of the high-temperature ceramic tube with double-channel is the channel of sampling the gas in CDQ coke oven; the high-temperature ceramic tube with double-channel is located at the top of the chute area of the CDQ coke oven and passes through the oven shell and oven wall outside the oven shell along the radical direction of the CDQ coke oven; the temperature measuring element connects with the temperature indicator via temperature signal transmission wire protected by ceramic sleeve; the end of the lower channel of the high-temperature ceramic tube with double-channel located at outside the CDQ coke oven connects with the gas inlet of the vacuum tank and is controlled by a gas inlet valve; the part of high-temperature ceramic tube with double-channel outside the CDQ coke oven is wrapped by a cooling device.

An apparatus for on-line temperature measurement and gas sampling used in the chute area of CDQ coke oven and the using method thereof can also be further realized by the technical measures adopted as follows:

The volume range of said vacuum tank is from 0.2 cubic meter to 5 cubic meter.

The accuracy of vacuum gage is at least 0.002 MPa.

Said high-temperature ceramic tube with double-channel is made of silicon nitride bonded silicon carbide or silicon nitride or corundum containing aluminum oxide content above 99%.

The outside diameter of said high-temperature ceramic tube with double-channel ranges from 50 millimeters to 120 millimeters and the inside diameter of the upper channel and lower channel ranges from 20 millimeters to 50 millimeters.

One end of said high-temperature ceramic tube with double-channel has an oblique cross-section and the other end is a cross-section, the angle between the oblique cross-section and the axis of said high-temperature ceramic tube is 30 degree to 60 degree and the oblique cross-section is closed by a heat-resistance mesh.

The end with an oblique cross-section of said high-temperature ceramic tube with double-channel is located inside the CDQ coke oven.

The mesh number of said heat-resistance mesh is more than 200 meshes.

The installation method of the temperature measuring element placed in upper channel of said high-temperature ceramic tube with double-channel is as follows: temperature measuring element is fixed in a refractory brick and the probe is exposed; then the refractory brick is fixed on the inner wall of upper channel of said high-temperature ceramic tube with double-channel; the temperature measuring element and the refractory brick, the refractory brick and the inner wall of upper channel of said high-temperature ceramic tube with double-channel are all bonded by the refractory mortar matched with the refractory brick.

Said refractory brick is selected from one or more of clay refractory brick, high-alumina refractory brick, mullite refractory brick and corundum refractory brick.

The nominal working pressure of said gas inlet valve is at least 20 MPa.

The cooling device is water circulating cooling device or inert gas circulating cooling device.

Steps of using the apparatus for on-line temperature measurement and gas sampling used in the chute area of CDQ coke oven are as follows:
  Step 1: opening the gas inlet valve of vacuum tank, the gas in the CDQ coke oven flows to the vacuum tank because of the pressure difference between the vacuum tank and the CDQ coke oven;
  Step 2: closing the gas inlet valve of vacuum tank until the vacuum gage displays zero;
  Step 3: discharging the gas in the vacuum tank until the vacuum gage displays the maximum vacuum;
  Step 4: opening the gas inlet valve of vacuum tank, the gas in the CDQ coke oven flows to the vacuum tank because of the pressure difference between the vacuum tank and the CDQ coke oven;
  Step 5: closing the gas inlet valve of vacuum tank until the vacuum gage displays zero;
  Step 6: the gas in the vacuum tank is the sampling gas after closing the gas inlet valve of vacuum tank.

The present invention of an apparatus for on-line temperature measurement and gas sampling used in the chute area of CDQ coke oven and using method thereof have advantages as follows:
  1. The apparatus is simple in arrangement and convenient to manufacture.
  2. The operation is convenient and easy to master, the present invention provides a basis for the research of refractories used for the CDQ coke oven lining and provides support for the temperature control in the inner area of the CDQ coke oven and stable coke quenching.
  3. A real-time monitoring of the inner environment in the CDQ coke oven can be achieved.

DETAIL DESCRIPTION OF THE DRAWINGS

Wherein, 1 is high-temperature ceramic tube with double-channel, 2 is upper channel of high-temperature ceramic tube with double-channel, 3 is lower channel of high-temperature ceramic tube with double-channel, 4 is heat-resistant mesh, 5 is temperature measuring element, 6 is refractory brick, 7 is the temperature signal transition wire protected by a ceramic sleeve, 8 is temperature indicator, 9 is gas tube, 10 is vacuum tank, 11 is chute area, 12 is oven shell, 13 is oven wall, 14 is annular air duct wall, 15 is passing beam brick, 16 is cooling device, 17 is gas inlet valve, 18 is vacuum gage, 19 is gas outlet valve 19.

Details Description of First Embodiments

The present invention will be further described in conjunction with the embodiments and the drawings.

An apparatus for on-line temperature measurement and gas sampling used in the chute area of CDQ coke oven includes an oven internal unit and an oven external unit.

Figure 1:
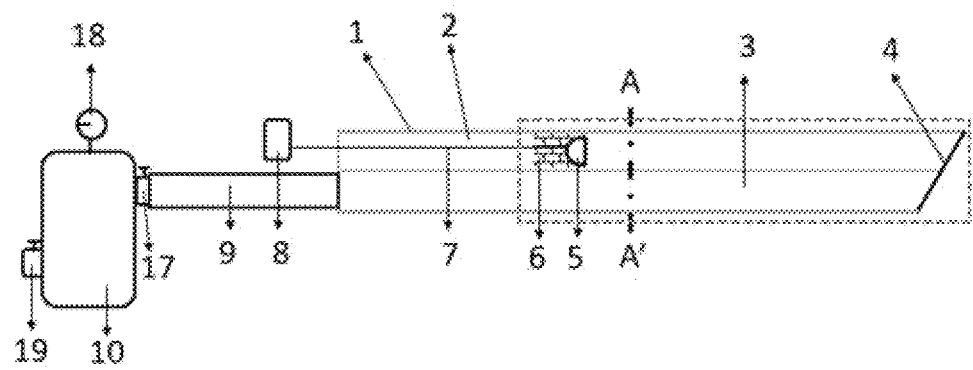
FIG. 1 is a structure schematic diagram of the apparatus for on-line temperature measurement and gas sampling used in the chute area of CDQ coke oven according to the embodiment of the present invention.
Figure 2:
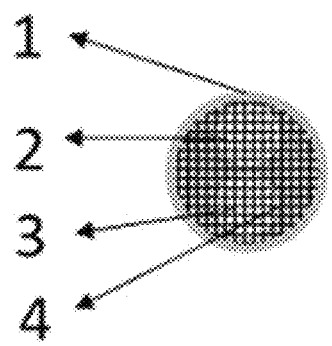
FIG. 2 is the right view of A-A' cross section of the FIG. 1.
Figure 3:
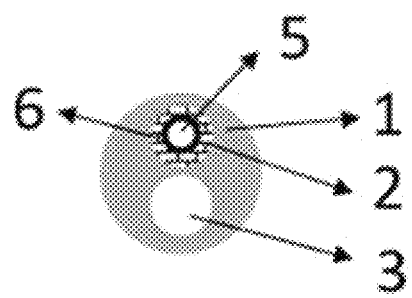
FIG. 3 is the left view of A-A' cross section of the FIG. 1.

Referring to the FIGS. 1-3, FIG. 1 is a structure schematic diagram of the apparatus for on-line temperature measurement and gas sampling used in chute area of CDQ coke oven, FIG. 2 and FIG. 3 are the right view and left view of A-A' cross section in FIG. 1 respectively.

The apparatus for on-line temperature measurement and gas sampling used in the chute area of CDQ coke oven comprises a high-temperature ceramic tube with double-channel (1), a heat-resistant mesh (4), a temperature measuring element (5), a temperature indicator (8) and a vacuum tank (10). The temperature measuring element (5) is placed in the upper channel of the high-temperature ceramic tube with double-channel and the temperature indicator (8) is located out of the high-temperature ceramic tube with double-channel. The lower channel of the high-temperature ceramic tube with double-channel is the channel of sampling the gas in the CDQ coke oven. The end of the lower channel is connected with the vacuum tank. The apparatus for on-line temperature measurement and gas sampling used in the chute area of CDQ coke oven is located at the top of the chute area of the CDQ coke oven. The principle of the gas sampling method of the apparatus is using a negative pressure of the vacuum tank to make the gas in the CDQ coke oven to flow into the vacuum tank automatically.

The high-temperature ceramic tube with double-channel is made of silicon nitride bonded silicon carbide or silicon nitride or corundum containing aluminum oxide content above 99%.

The outside diameter of the high-temperature ceramic tube with double-channel ranges is from 50 millimeters to 120 millimeters and the inside diameter of the upper channel and lower channel ranges is from 20 millimeters to 50 millimeters.

One end of the high-temperature ceramic tube with double-channel has an oblique cross-section and the other end is a cross-section.

The angle of the oblique cross-section with the axis of high-temperature ceramic tube with double-channel is 45 degree.

The oblique cross-section is closed by a heat-resistance mesh and the mesh number of said heat-resistance mesh is more than 200 meshes.

The temperature measuring element is a non-contact infrared temperature probe with ceramic protective sleeve and the measuring temperature of said probe ranges from 500 degree C. to 1500 degree C., the detection distance ranges from 0.8 meters to 3 meters, the minimum size of detection target is 4 millimeters.

The temperature measuring element is placed in the upper channel of the high-temperature ceramic tube with double-channel.

Figure 4:
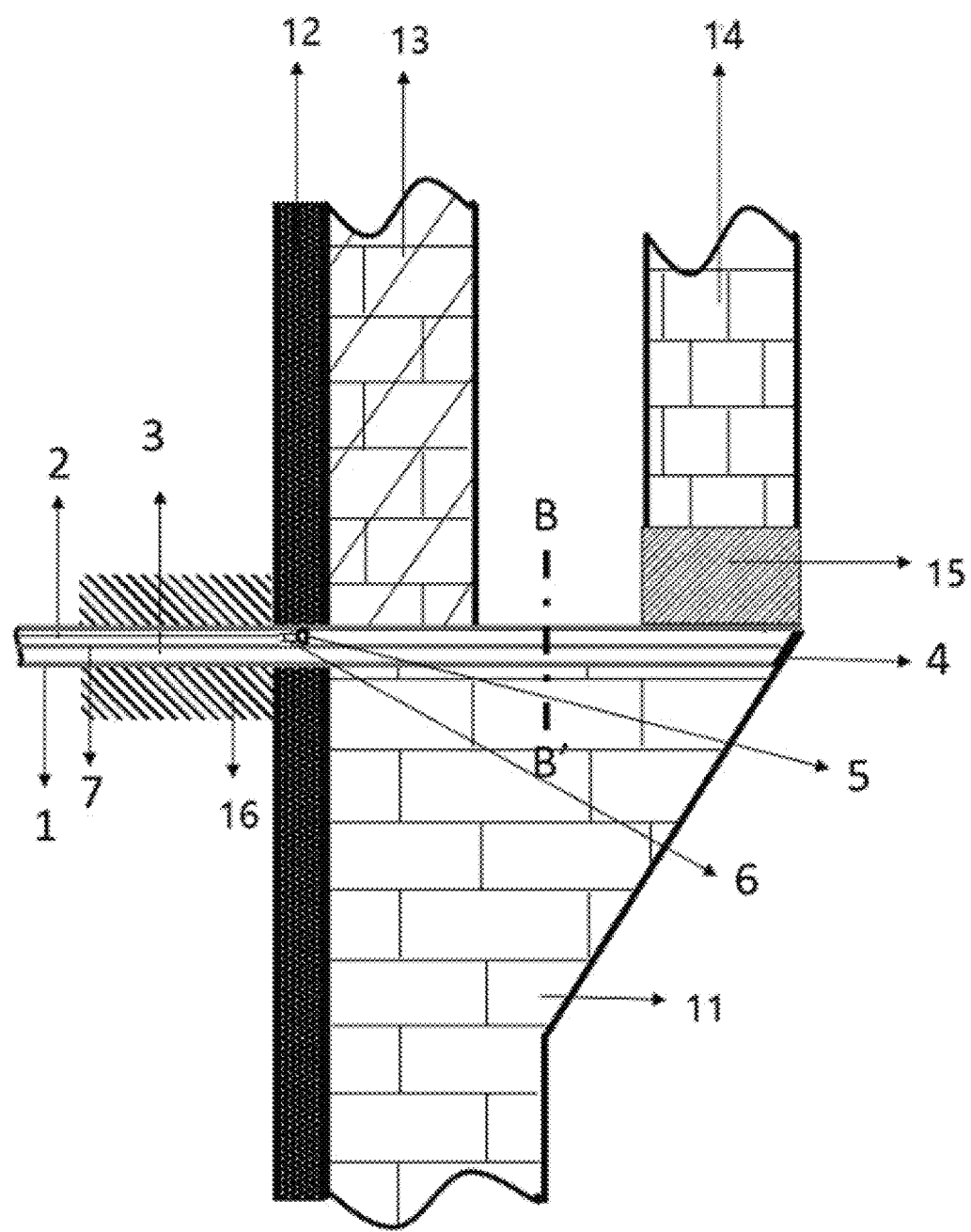
FIG. 4 is the cross section view of the apparatus for on-line temperature measurement and gas sampling installed in the chute area of CDQ coke oven.
Figure 5:
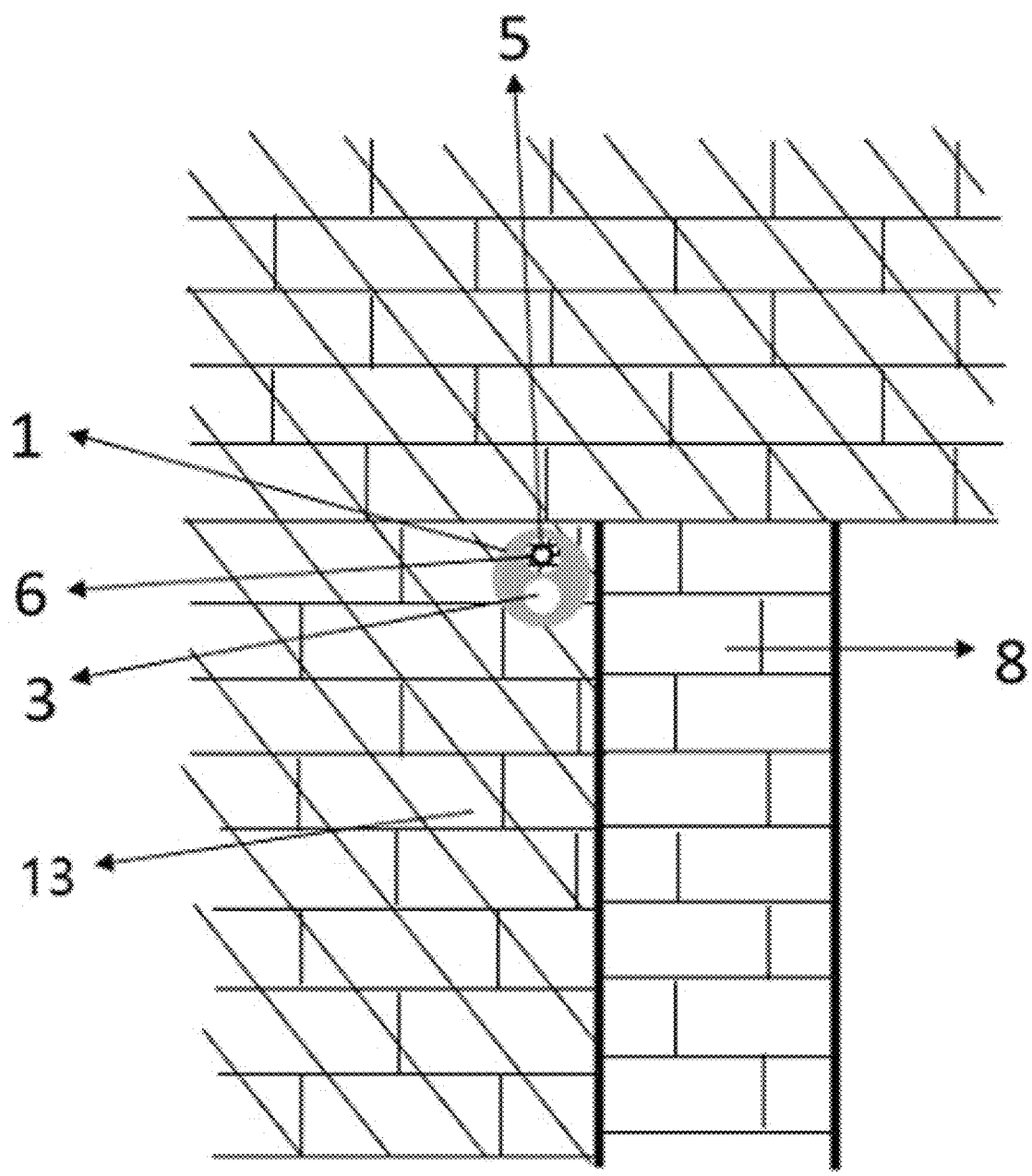
FIG. 5 is the right view of B-B' cross section in FIG. 4.
Figure 6:
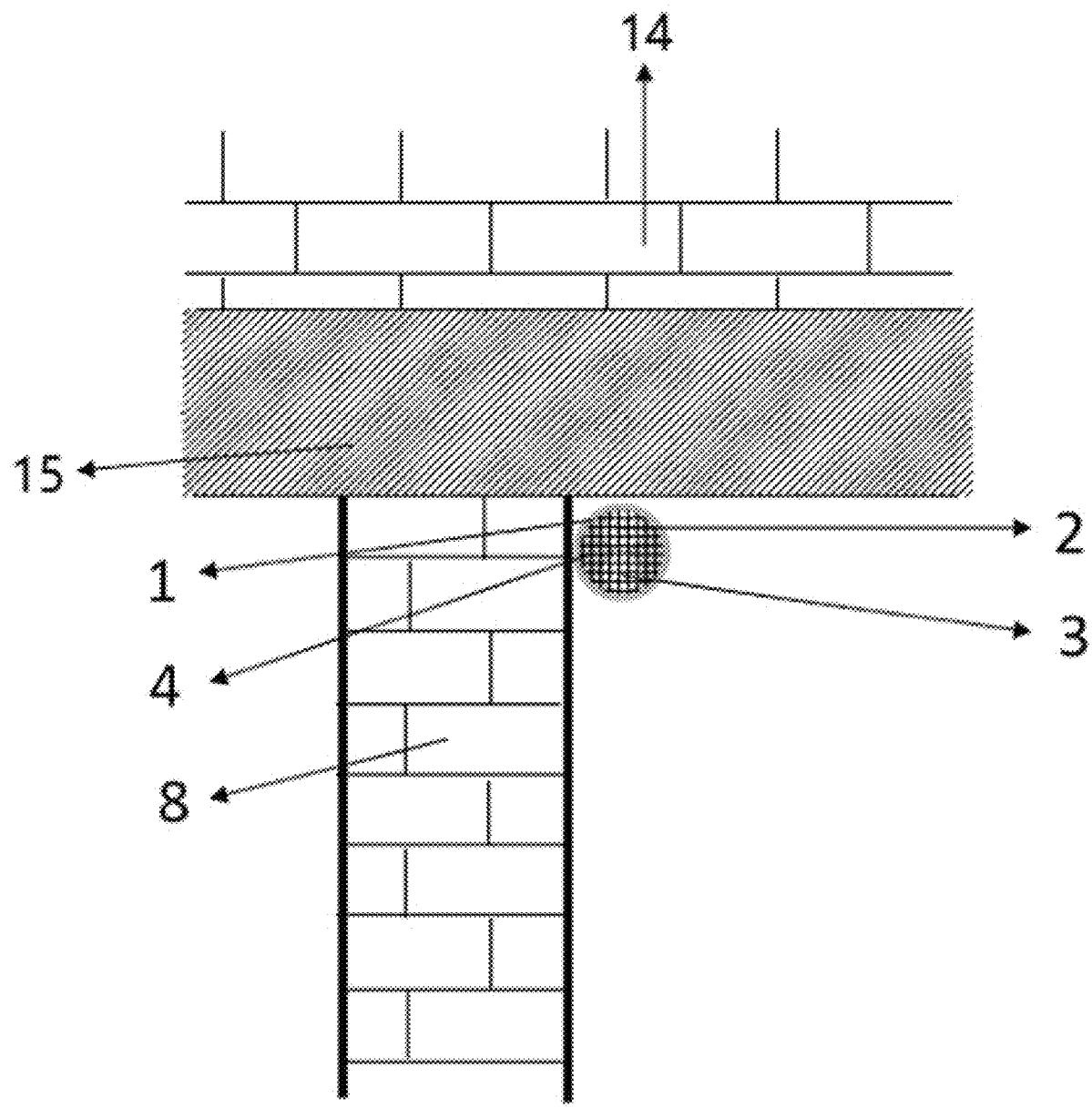
FIG. 6 is the left view of B-B' cross section in FIG. 4.

FIG. 4 is the cross section view of the apparatus for on-line temperature measurement and gas sampling installed in the chute area of CDQ coke oven, and FIG. 5 and FIG. 6 are the right view and left view of B-B' cross section in FIG. 4, respectively.

The installation method of the temperature measuring element is that: the temperature measuring element is fixed in a refractory brick and its probe is exposed; then the refractory brick is fixed on the inner wall of the upper channel of said high-temperature ceramic tube with double-channel; the temperature measuring element and the refractory brick, the refractory brick and the inner wall of upper channel of said high-temperature ceramic tube with double-channel are all bonded by the refractory mortar matched with the refractory brick.

The refractory bricks (6) are corundum bricks.

The temperature indicator (8) is placed outside the CDQ coke oven and the accuracy is 0.1 degree C.

The temperature measuring element (5) connects with the temperature indicator (8) via temperature signal transmission wire protected by a ceramic sleeve (7).

Volume of the vacuum tank is 5 cubic meter and the vacuum tank is equipped with a vacuum gage (18) with accuracy of at least 0.002 MPa.

The end of the lower channel of the high-temperature ceramic tube with double-channel (1) located outside the CDQ coke oven connects with the vacuum tank (10) by a gas tube (9) and is controlled by a gas inlet valve (17).

The apparatus for on-line temperature measurement and gas sampling used in the chute area of CDQ coke oven is located at the top of the chute area of the CDQ coke oven.

The installation direction for the apparatus for on-line temperature measurement and gas sampling used in the chute area of CDQ coke oven is that: the high-temperature ceramic tube with double-channel passes through the oven shell 12 and oven wall 13 outside the oven shell along the radical direction of the CDQ coke oven; the oblique end closed by heat-resistant mesh is flush with the inclined surface of the chute area; and the part of the high-temperature ceramic tube with double-channel outside the CDQ coke oven is wrapped with cooling device (16).

The cooling device (16) is a water circulating cooling device or an inert gas circulating cooling device.

Monitoring the temperature of internal oven is achieved by operating the temperature indicator.

Details Description of Second Embodiments

Steps of using the apparatus for on-line temperature measurement and gas sampling used in the chute area of CDQ coke oven are as follows:

Step 1: opening the gas inlet valve (17) of the vacuum tank, the gas in the CDQ coke oven flows to the vacuum tank because of the pressure difference between the vacuum tank and the CDQ coke oven;

Step 2: closing the gas inlet valve of the vacuum tank until the vacuum gage displays zero;

Step 3: discharging the gas in the vacuum tank by opening the gas outlet valve (19) until the vacuum gage displays the maximum vacuum;

Step 4: opening the gas inlet valve of vacuum tank, the gas in the CDQ coke oven flows to the vacuum tank because of the pressure difference between the vacuum tank and the CDQ coke oven;

Step 5: closing the gas inlet valve of vacuum tank until the vacuum gage displays zero;

Step 6: the gas in the vacuum tank after closing the gas inlet valve of the vacuum tank is the sampling gas.

The present invention has substantive features and significant technological progress. The apparatus for on-line temperature measurement and gas sampling used in the chute area of CDQ coke oven and using method thereof solve the current problem that hard to measure the temperature and to sample gas in the most complicated environment part of the CDQ coke oven, therefor provides a basis for the research of refractories used for CDQ coke oven lining and offers a support for the temperature control for the inner area of the oven and the stable coke quenching. The apparatus is simple in arrangement and convenient to manufacture. A real-time monitoring for inner environment of CDQ coke oven can be achieved.

The above embodiments are only for explaining the present invention, rather than limiting it. Those skilled in the art may make various modifications without departing from the spirit and scope of the present invention. All equivalent technical solutions belong to the scope of the present invention and defined by the claims.

What is claimed is:

1. An apparatus for on-line temperature measurement and gas sampling used in chute area of dry CDQ coke oven comprising:
    an oven external unit including a temperature indicator, a gas tube, and a vacuum tank, a precision of said temperature indicator is 0.1 degree C. and said vacuum tank possesses a gas inlet valve, a gas outlet valve and a vacuum gage;
    an oven internal unit including a temperature measuring element, said temperature measuring element is a non-contact infrared temperature probe with ceramic protective sleeve, a measuring temperature range of said probe ranges is from 500 degree C. to 1500 degree C., a detection distance range is from 0.8 meters to 3 meters, the minimum size of detection target is 4 millimeters;
    wherein, the temperature measuring element is placed in an upper channel of a high-temperature ceramic tube with double-channel, a lower channel of the high-temperature ceramic tube with double-channel is a channel of sampling gas in a CDQ coke oven;
    wherein, the high-temperature ceramic tube with double-channel is located at top of the chute area of the CDQ coke oven and passes through an oven shell and an oven wall outside the oven shell along a radical direction of the CDQ coke oven;
    wherein, the temperature measuring element connects with the temperature indicator via a temperature signal transmission wire protected by a second ceramic sleeve;
    wherein, an end of the lower channel of the high-temperature ceramic tube with double-channel located outside the CDQ coke oven connects with the gas tube of the vacuum tank and is controlled by the gas inlet valve, a part of the high-temperature ceramic tube with double-channel outside the CDQ coke oven is wrapped by a cooling device.

2. The apparatus as claimed in claim 1, wherein a volume of said vacuum tank ranges from 0.2 cubic meter to 5 cubic meter.

3. The apparatus as claimed in claim 1, wherein the accuracy of the vacuum gage is at least 0.002 MPa.

4. The apparatus as claimed in claim 1, wherein said high-temperature ceramic tube with double-channel is made of silicon nitride bonded silicon carbide or silicon nitride or corundum containing aluminum oxide content above 99%.

5. The apparatus as claimed in claim 1, wherein an outside diameter of said high-temperature ceramic tube with double-channel ranges from 50 millimeters to 120 millimeters and an inside diameter of the upper channel and lower channel ranges from 20 millimeters to 50 millimeters.

6. The apparatus as claimed in claim 1, wherein one end of said high-temperature ceramic tube with double-channel has an oblique cross-section and other end is a cross-section, an angle of the oblique cross-section and an axis of said high-temperature ceramic tube with double-channel is 30 degree to 60 degree, and the oblique cross-section is closed by a heat-resistance mesh.

7. The apparatus as claimed in claim 6, wherein the end with an oblique cross-section of said high-temperature ceramic tube with double-channel is in the CDQ coke oven.

8. The apparatus as claimed in claim 6, wherein the mesh number of said heat-resistance mesh is more than 200 meshes.

9. The apparatus as claimed in claim 1, wherein the temperature measuring element is fixed in a refractory brick and the probe is exposed; the refractory brick is fixed on the inner wall of the upper channel of said high-temperature ceramic tube with double-channel; the temperature measuring element and the refractory brick, the refractory brick and the inner wall of upper channel of said high-temperature ceramic tube with double-channel are all bonded by refractory mortar matched with the refractory brick.

10. The apparatus as claimed in claim 9, wherein said refractory brick selected from one or more of clay refractory brick, high-alumina refractory brick, mullite refractory brick and corundum refractory brick.

11. The apparatus as claimed in claim 1, wherein a nominal working pressure of said gas inlet valve is at least 20 MPa.

12. The apparatus as claimed in claim 1, wherein the cooling device is a water circulating cooling device or an inert gas circulating cooling device.

13. A process of use of the apparatus as claimed in claim 1 comprising:
  Step 1: opening the gas inlet valve of the vacuum tank, the gas in the CDQ coke oven flows to the vacuum tank because of the pressure difference between the vacuum tank and the CDQ coke oven;
  Step 2: closing the gas inlet valve of the vacuum tank until the vacuum gage displays zero;
  Step 3: discharging the gas in the vacuum tank until the vacuum gage displays the maximum vacuum;
  Step 4: opening the gas inlet valve of the vacuum tank, the gas in the CDQ coke oven flows to the vacuum tank because of the pressure difference between the vacuum tank and the CDQ coke oven;
  Step 5: closing the gas inlet valve of the vacuum tank until the vacuum gage displays zero;
  Step 6: the gas in the vacuum tank is sampling gas after closing the gas inlet valve of the vacuum tank.

\* \* \* \* \*